US010915851B2

(12) United States Patent
Tummala et al.

(10) Patent No.: US 10,915,851 B2
(45) Date of Patent: Feb. 9, 2021

(54) GENERATING A UNIFIED GRAPHICAL USER INTERFACE VIEW FROM DISPARATE SOURCES

(71) Applicant: SAP SE, Walldorf (DE)

(72) Inventors: Venkata Tummala, San Jose, CA (US); Arunkumar Thiyagarajan, Cupertino, CA (US); Thaison Nguyen, Palo Alto, CA (US)

(73) Assignee: SAP SE, Walldorf (DE)

( * ) Notice: Subject to any disclaimer, the term of this patent is extended or adjusted under 35 U.S.C. 154(b) by 148 days.

(21) Appl. No.: 16/195,799

(22) Filed: Nov. 19, 2018

(65) Prior Publication Data

US 2020/0160238 A1   May 21, 2020

(51) Int. Cl.
*G06Q 10/06* (2012.01)
*G06F 3/0484* (2013.01)
*G06F 16/904* (2019.01)
*G06F 16/80* (2019.01)

(52) U.S. Cl.
CPC ....... *G06Q 10/067* (2013.01); *G06F 3/04842* (2013.01); *G06F 16/80* (2019.01); *G06F 16/904* (2019.01)

(58) Field of Classification Search
None
See application file for complete search history.

(56) References Cited

U.S. PATENT DOCUMENTS

| | | | | |
|---|---|---|---|---|
| 2002/0072988 A1* | 6/2002 | Aram | ........... | G06Q 10/087 705/26.1 |
| 2002/0116241 A1* | 8/2002 | Sandhu | ........... | G06Q 10/0631 705/7.12 |
| 2002/0178077 A1* | 11/2002 | Katz | ........... | G06Q 10/10 705/7.36 |
| 2003/0033179 A1* | 2/2003 | Katz | ........... | G06Q 10/0631 705/7.12 |
| 2003/0074282 A1* | 4/2003 | Lee | ........... | G06Q 10/087 705/28 |
| 2006/0149639 A1* | 7/2006 | Liu | ........... | G06Q 30/02 705/14.4 |
| 2008/0249901 A1* | 10/2008 | Hosalli | ........... | G06Q 40/00 705/30 |

* cited by examiner

*Primary Examiner* — Kim T Nguyen
(74) *Attorney, Agent, or Firm* — Schwegman Lundberg & Woessner, P.A.

(57) ABSTRACT

In an example, a software intelligence solution is provided that matches incoming information from multiple enterprise resource planning (ERP) systems, such as inventory and estimate reports, with the ERP systems that sent them. This information may then be consolidated into a common view, using various techniques for storing and aggregating information received from the multiple ERP systems.

20 Claims, 9 Drawing Sheets

Figurer 6

GENERATING A UNIFIED GRAPHICAL USER INTERFACE VIEW FROM DISPARATE SOURCES

BACKGROUND

In Business-to-Business (B2B) transactions, there is often a supplier providing goods and/or services to a buyer. Since both sides of the transaction are businesses, each side often uses estimate and inventory software to manage inventory and estimate future orders. For example, a buyer may be a device manufacturer and the suppliers may supply the components for the device. The buyer need not purchase the components from the supplier (or just from the supplier) while the supplier need not sell the components (or just sell the components) to the buyer.

Enterprise Resource Planning (ERP) software generally provides both inventory and estimate management tools for both suppliers and buyers. These systems provide, for example, screens showing particular information (also called views) about a business relationship. A user of ERP software, however, needs to log into different systems in order to see views showing information from multiple business partners. For example, the hypothetical device manufacturer would only be able to see a view showing inventory and estimate from supplier #1 and a separate view showing inventory and estimate from supplier #2. Likewise, the hypothetical supplier #1 would only be able to see a view showing a estimate for a particular component received from a first hypothetical device manufacturer and a separate view showing a estimate for the same particular component received from a second hypothetical device manufacturer. From the technological standpoint, there currently is no solution that allows for a single view to be created showing information from multiple suppliers'/buyers' ERP systems.

BRIEF DESCRIPTION OF DRAWINGS

The present disclosure is illustrated by way of example and not limitation in the figures of the accompanying drawings, in which like references indicate similar elements and in which:

FIG. 3 is an example graphical user interface, in accordance with an example embodiment.

FIG. 4 is an example graphical user interface, in accordance with another example embodiment.

FIG. 6 is a flow diagram illustrating a method for generating and displaying a common view in a graphical user interface, in accordance with an example embodiment.

DETAILED DESCRIPTION

The description that follows includes illustrative systems, methods, techniques, instruction sequences, and computing machine program items that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, a software intelligence solution is provided that matches incoming information from multiple ERP systems, such as inventory and estimate reports, with the ERP systems that sent them. This information may then be consolidated into a common view.

Figure 1:
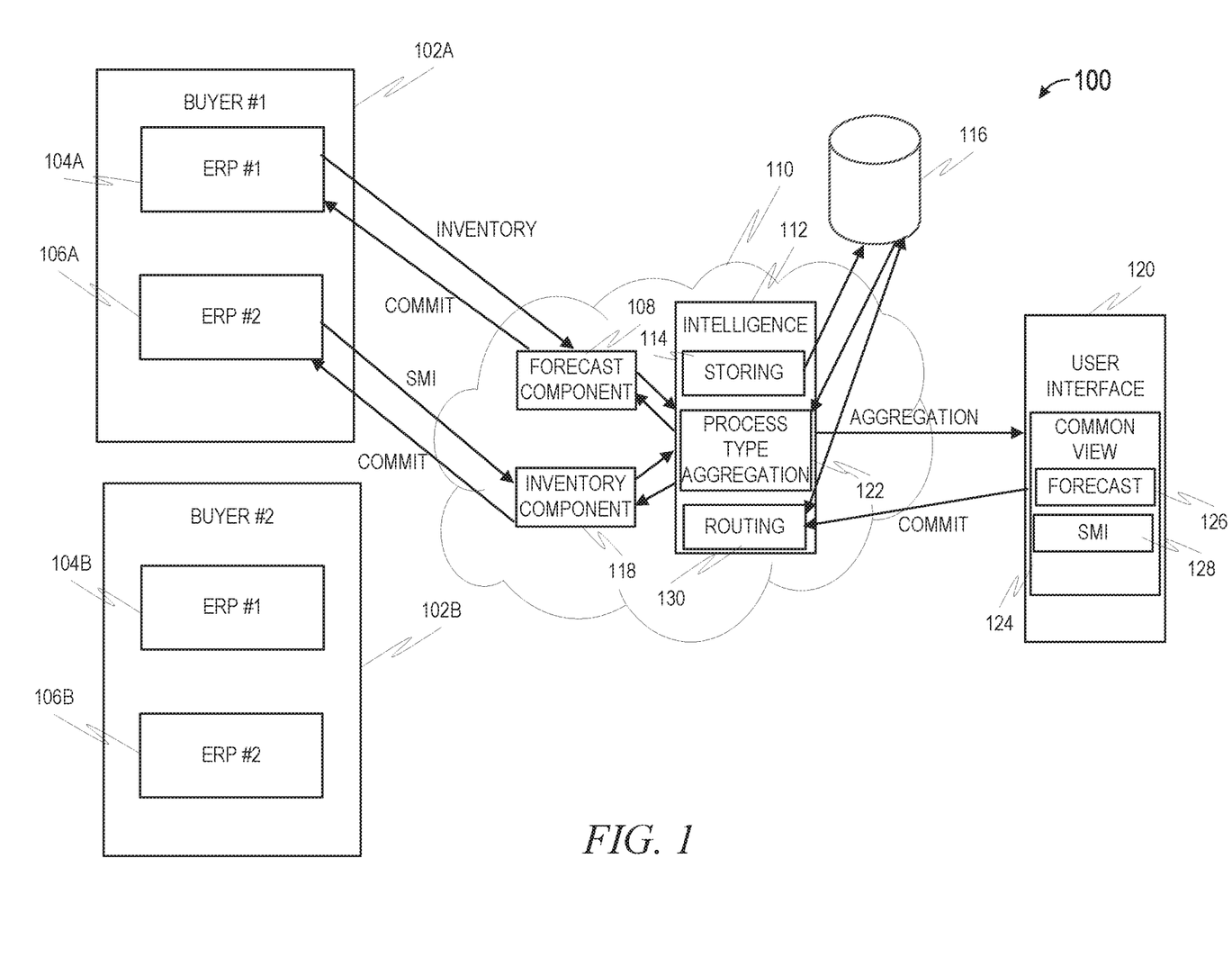
FIG. 1 is a block diagram of an application system, in accordance with an example embodiment.

FIG. 1 is a block diagram of an application system 100, in accordance with an example embodiment. Here, the application system 100 comprises a first buyer 102A and a second buyer 102B. The first and second buyers 102A, 102B each represents a different business entity potentially purchasing a part, item, or service (hereinafter all generally referred to as a "item") offered by a supplier (not pictured). The first and second buyers 102A, 102B each hosts a first ERP system 104A, 104B and a second system ERP 106A, 106B. This is merely for illustrative purposes; in reality, each buyer 102A, 102B may host any number of one or more ERP systems. In this example, the first ERP system 104A, 104B is dedicated to estimating while the second ERP system 106A, 106B is dedicated to inventory management. It should be noted that there may be more than one ERP system dedicated to inventory management and/or more than one ERP system dedicated to estimating operated by a single business entity, such as buyer 102A. For example, multiple inventory management ERPs for a single business entity may represent different manufacturing plants.

The first ERP 104A for the first buyer 102A may generate an item activity, such as a estimate, and send an inventory specification to a estimate component 108 located in a cloud application provider 110. In an example embodiment, this estimate may be in the form of an Extensible Markup Language (XML) document. Additionally, in an example embodiment, this estimate may also include an identifier of the ERP component that generated it. In this case, the identifier would uniquely identify the first ERP system 104A (as distinguished from second the ERP system 106A or even from the first ERP system 104B). The identifier may also contain an identification of the item to which it applies. The estimate component 108 may then send this estimate, and the accompanying identification, to an intelligence component 112, and specifically a storing component 114. The storing component 114 may then store both the estimate and the accompanying identifications in a database 116. In an example embodiment, the database 116 is an in-memory database. An in-memory database is a database management system that primarily relies on main memory for computer data storage. It is contrasted with database management systems that employ a disk storage mechanism. The mechanism by which the storing component 114 stores this information may vary depending on implementation, but in an example embodiment a table is used to store the item activity (or a reference to the item activity) in one column, the part identification in another column, and the ERP identifier in the third column. As will be seen, this same table can then be used to store other types of item activities from other ERP systems in the same manner.

The second ERP system 106A may generate an item activity, such as a inventory specification (also known as a supplier managed inventory (SMI) activity) and send this item activity an inventory component 118 located in the cloud application provider 110. In an example embodiment, this SMI activity may be in the form of an Extensible Markup Language (XML) document. Additionally, in an example embodiment, this SMI activity may also include an identifier of the ERP component that generated it and an identification of the item to which it applies.

The inventory component 118 may then send the SMI activity to the storing component 114 in the intelligence component 112, where it will store the SMI activity and the associated identifiers in the same manner as with the estimate.

While not explicitly pictured, the ERP systems 104B, 106B of the second buyer 102B may perform similar tasks. The result is that the database 116 will store item activities from various different ERP systems 104A, 104B, 106A, 106B across multiple buyers 102A, 102B with identifiers of the ERP systems 104A, 104B, 106A, 106B that generated the item activities and the items to which they apply.

At some later point, a supplier may wish to view a common view having inventory and estimates for a particular item from one or multiple different buyers. The supplier may use a graphical user interface 120 to request the common view from the intelligence component 112. This request may be handled by a process type aggregation component 122, which may aggregate the appropriate information from the database 116. Specifically, this may involve retrieving any item activities corresponding to a specified item, based on the item identifications stored by the database 116. A common view 124 may then be generated and delivered to the graphical user interface 120 for display. The details of this common view 124 may vary depending on implementation, but in an example embodiment the common view 124 will include both estimate 126 and SMI 128 information for a specified item, across multiple buyers 102A, 102B.

The common view 124 may also be displayed by the graphical user interface 120 in a manner that permits the supplier to commit to an individual item activity. This commitment may then be sent to a routing component 130, which may then access the database 116 to determine which ERP 104A, 104B, 106A, 106B was associated with the corresponding item activity. As such, the commit received from the graphical user interface 120 may include an identification of the item activity, which can be used to identify the corresponding ERP in the database 116. The routing component 130 may then send this commit to either the estimate component 108 or the inventory component 118 with instructions to send the commit to the appropriate ERP system 104A, 104B, 106A, 106B.

It should be noted that while this figure depicts a use case in which the buyers 102A, 102B are generating the item activities and the supplier is using the graphical user interface 120, one of ordinary skill in the art will recognize that similar functionality may operate in the reverse case—where the business entities generating the item activities are suppliers and the business entity using the graphical user interface to view a common view is a buyer. The present solution is robust enough to apply to both scenarios.

Figure 2:
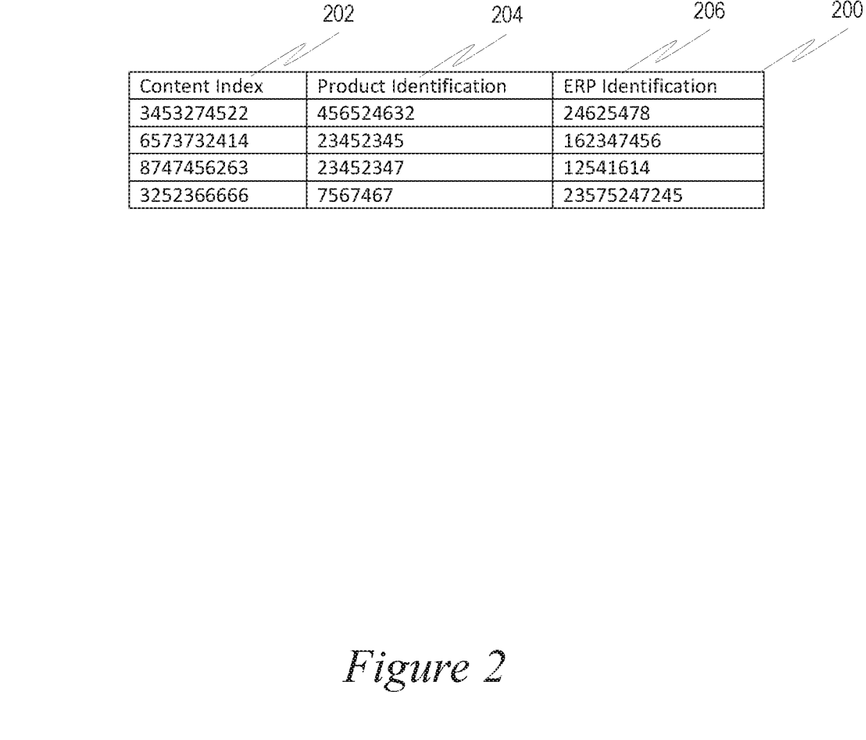
FIG. 2 is a diagram illustrating an example data structure for storage of an item activity and corresponding identifications in accordance with an example embodiment.

FIG. 2 is a diagram illustrating an example data structure 200 for storage of an item activity and corresponding identifications in accordance with an example embodiment. Here, the example data structure 200 is a record having three columns 202, 204, 206. Column 202 contains indexes to another data structure where the substance of the item activity is stored. This substance may include, for example, in the case of an SMI activity, any information received about the SMI activity. Column 204 may contain item identifications that uniquely identify the items corresponding to the item activities. Column 206 may contain ERP identifications that uniquely identify the ERP systems or instances that generated the corresponding item activities. In some example embodiments, another column may be used to uniquely identify each item activity, which would allow a routing component 130 to match up a commit received via the graphical user interface 120 with the corresponding item activity, although this may not be necessary as the indexes in column 202 may be used for a similar purpose.

FIG. 3 is an example graphical user interface 300, in accordance with an example embodiment. Here, the graphical user interface 300 depicts a main list page for a customer (e.g., a buyer). The main list includes a part listing section 302 and a search filter section 304. The part listing section 302 lists different parts/items/services available from suppliers as well as other information about the parts. Specifically, each part may have a supplier 306A, customer part number 306B, supplier part number 306C, customer location 306D, lead time 306E, status 306F, last customer update 306G, last supplier update 306H, quantity available 306I, status of stock on hand 306J, minimum stock level 306K, maximum stock level 306L, unit 306M, projected stock 306N, and process type 306O. It should be noted that a part instance in this context is an instance of a combination of a part and a supplier, indicating that a particular part is available from a particular supplier in accordance with the other information provided. There may be an identical part available from a different supplier, which would be given its own part instance.

The search filter section 304 allows a viewer of the graphical user interface 300 to enter in values for various search filters, including supplier 308A, customer part number 308B, supplier part number 308C, customer location 308D, planner code 308E, part category 308F, line of business 308G, item family 308H, item subfamily 308I, internal program code 308J, program code 308K, part type 308L, process type 308M, and part status 308N.

Additionally, a checkbox 310 is provided allowing the viewer of the graphical user interface 300 to select to show unique part and plants. This checkbox 310 enables or disables the combined view discussed in the present disclosure.

FIG. 4 is an example graphical user interface 400, in accordance with another example embodiment. Here, the graphical user interface 400 depicts a main list page for a supplier (e.g., a parts provider). The main list includes a part listing section 402 and a search filter section 404. The part listing section 402 lists different parts/items/services available to customers as well as other information about the parts. Specifically, each part instance may have a customer 406A, customer part number 406B, supplier part number 406C, customer location 406D, lead time 406E, status 406F, last customer update 406G, last supplier update 406H, quantity available 406I, status of stock on hand 406J, minimum stock level 406K, maximum stock level 406L, unit 406M, minimum days of supply 406N, maximum days of supply 406O, projected stock 406P, and process type 406Q. It should be noted that a part instance in this context is an instance of a combination of a part and a customer, indicating that a particular part is available to a particular supplier in accordance with the other information provided. There may be an identical part available for a different customer, which would be given its own part instance.

The search filter section 404 allows a viewer of the graphical user interface 400 to enter in values for various search filters, including customer 408A, customer part number 408B, supplier part number 408C, customer location 408D, planner code 408E, part category 408F, line of business 408G, item family 408H, item subfamily 408I, program code 408J, part type 408K, process type 408L, and part status 408M.

Additionally, a checkbox 410 is provided allowing the viewer of the graphical user interface 400 to select to show unique part and plants. This checkbox 410 enables or disables the combined view discussed in the present disclosure.

Figure 5:
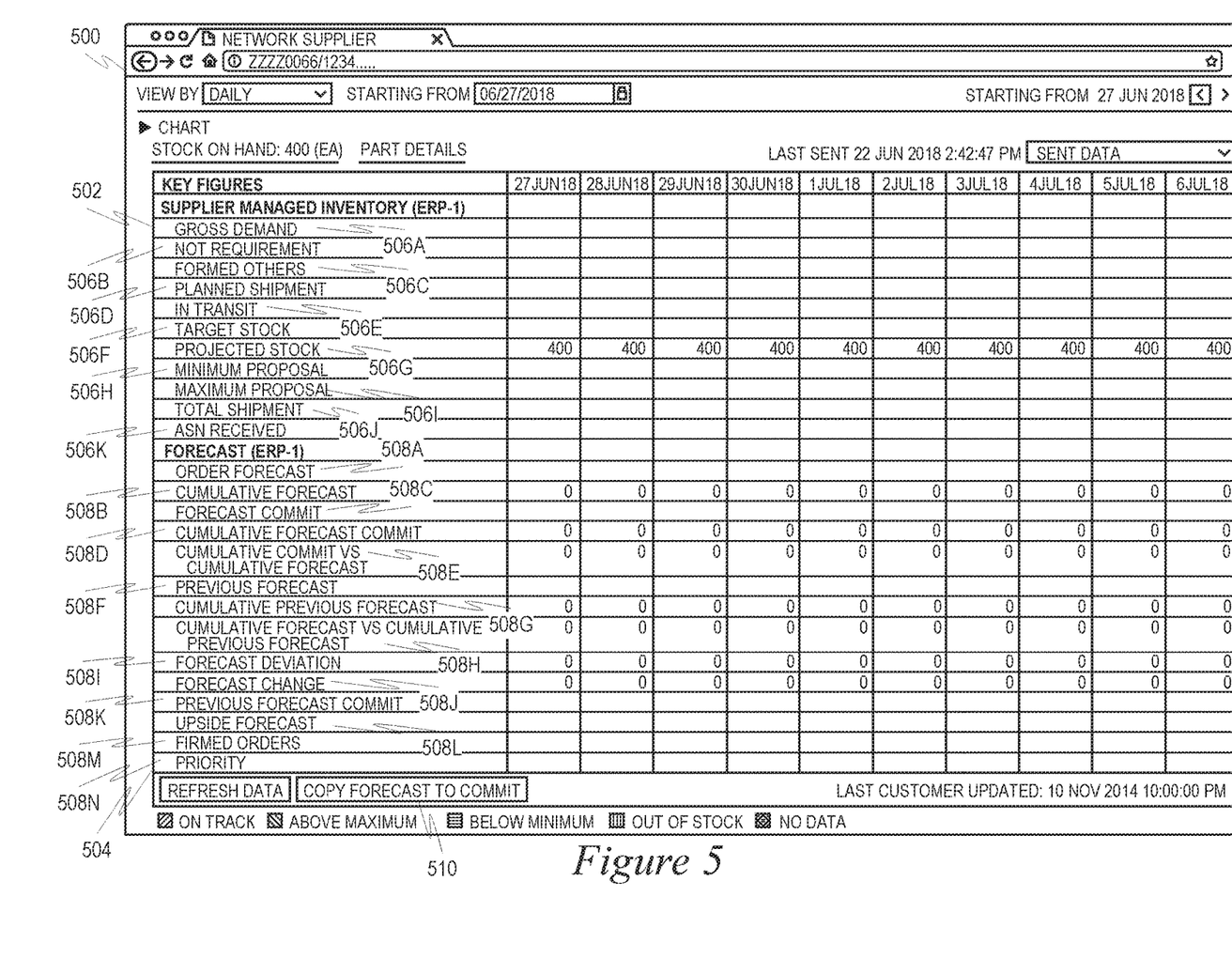
FIG. 5 is example graphical user interface, in accordance with another example embodiment.

FIG. 5 is example graphical user interface 500, in accordance with another example embodiment. Here, the graphical user interface 500 depicts a combined view for a particular part provided by a particular seller. Notably, the combined view includes information from multiple ERP systems (or, at least, multiple ERP system identifications as it is possible that the same ERP system can issue more that one type of information and label each as from a different ERP system identification). Specifically, information from SRI 502 and information from estimate 504 are depicted in the same common view. Such a common view display would not be possible in prior art systems because such systems would be unable to match up SRIs and estimates for the same part.

The information from SRI 502 may include, for example, gross demand 506A, net requirement 506B, firmed orders 506C, planned shipment 506D, in transit 506E, target stock 506F, projected stock 506G, minimum proposal 506H, maximum proposal 506I, total shipment 506J, and ASN received 506K.

The information from estimate 504 may include, for example, order estimate 508A, cumulative estimate 508B, estimate commit 508C, cumulative estimate commit 508D, cumulative estimate commit vs. cumulative estimate 508E, previous estimate 508F, cumulative previous estimate 508G, cumulative estimate vs. cumulative previous estimate 508H, estimate deviation 508I, estimate change 508J, previous estimate commit 508K, upside estimate 508L, firmed orders 508M, and priority 508N.

Also provided in the graphical user interface 500 is a "copy estimate to commit" button 510. This button 510, when selected by a viewer of the graphical user interface 500, acts to initiate a "commit" of the estimate. As described earlier, this begins a chain of events that involves locating the precise ERP that sent the estimate and sending that commit to the precise ERP.

FIG. 6 is a flow diagram illustrating a method 600 for generating and displaying a common view in a graphical user interface in accordance with an example embodiment. At operation 602, a first item activity communication is received from a first entity of a potential transaction for a first item, the item activity communication including information about the first entity providing or acquiring the first item, the first item activity communication further including a first Enterprise Resource Planning (ERP) software identification. At operation 604, the first item activity communication is stored in a first database. At operation 606, a second item activity communication is received from the first entity, the item activity communication including additional information about the first entity providing or acquiring the first item, the second item activity communication further including a second Enterprise Resource Planning (ERP) software identification. At operation 608, the second item activity communication is stored in the first database.

The first and second item activity communications may be XML files.

The above operations may be repeated for additional item activity communications from the first entity and/or from other entities. At operation 610, a request is received from a second entity of the potential transaction for the first item, the request including a request to view a common view, in a graphical user interface, for the first item, the request including an identification of the first item. At operation 612, in response to the receiving of the request from the second entity, information from the first item activity communication and the second item activity communication is retrieved from the first database using the identification of the first item. At operation 614, display is caused in the graphical user interface of a common view including information from both the first item activity communication and the second item activity communication in a single window.

At operation 616, a selection of a commit of one of the item activity communications is received via the graphical user interface. At operation 618, the database is accessed to identify the ERP identification associated with the one of the item activity communications selected in the commit. At operation 620, the commit is sent to the ERP software associated with the identified ERP identification.

Figure 7:
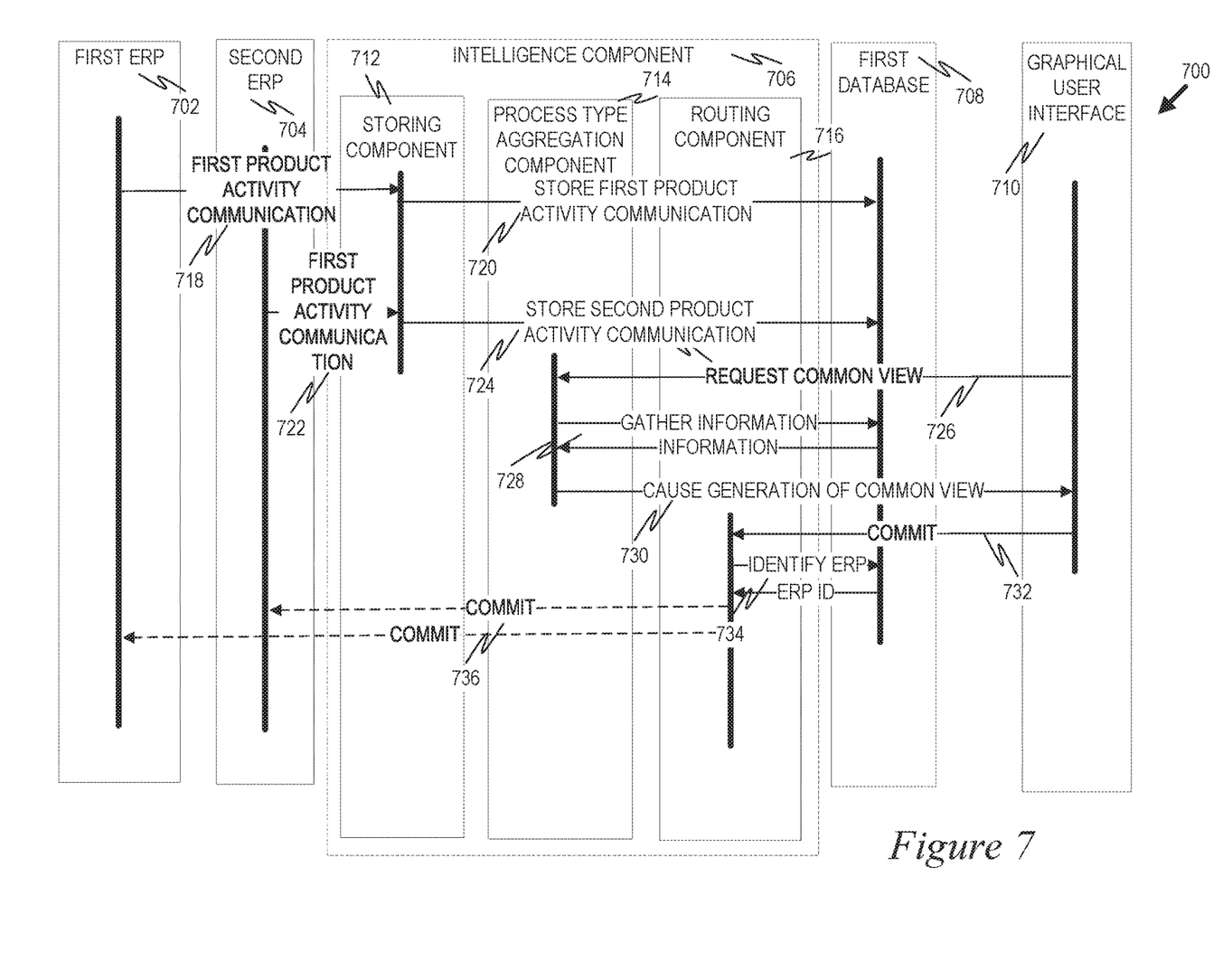
FIG. 7 is a ladder diagram illustrating a method for generating and displaying a common view in a graphical user interface, in accordance with an example embodiment.

FIG. 7 is a ladder diagram illustrating a method for generating and displaying a common view in a graphical user interface in accordance with an example embodiment. A system 700 includes a first ERP system 702, a second ERP system 704, an intelligence component 706, a first database 708, and a graphical user interface 710. The intelligence component 706 may include a storing component 712, a process type aggregation component 714, and a routing component 716.

At operation 718, the first ERP system 702 sends a first item activity communication to the storing component 712. It should be noted that in some example embodiments the first item activity communication is first sent to a estimate or inventory component, which forwards it to the storing component 712. At operation 720, the storing component 712 stores the first item activity communication in the first database 708. This may be stored in a manner that an ERP ID associated with the first item activity communication is easily searched-for to retrieve the information from the first item activity communication via the ERP ID. This may also be stored in a manner that an item ID associated with the first item activity communication is easy searched-for to retrieve the information from the first item activity communication via the item ID.

At operation 722, the second ERP system 704 sends a second item activity communication to the storing component 712. It should be noted that in some example embodiments the second item activity communication is first sent to a estimate or inventory component, which forwards it to the storing component 712. At operation 724, the storing component 712 stores the second item activity communication in the first database 708. This may be stored in a manner that an ERP ID associated with the second item activity communication is easily searched-for to retrieve the information from the second item activity communication via the ERP ID. This may also be stored in a manner that an item ID associated with the second item activity communication is easy searched-for to retrieve the information from the second item activity communication via the item ID.

At operation 726, the graphical user interface 710 may send a request to view a common view to the intelligence component 706, which may route this request to the process type aggregation component 714. At operation 728, the process type aggregation component 714 may gather information from the first and second item activity communications from the first database 708 using an item ID specified in the request. At operation 730, the graphical user interface 710 may be caused to generate a common view including information from both the first and second item activity communications.

At operation 732, the graphical user interface 710 may send a commit request for either the first or second item activity communications to the intelligence component 706, which may route it to a routing component 716. At operation 734, the routing component 716 then identifies the correct ERP using the ERP, for the corresponding item activity communication, in the first database 708. At operation 736, the routing component 716 then routes the commit to the corresponding first or second ERP system 702, 704.

EXAMPLES

Example 1

A system comprising:
at least one hardware processor; and
memory storing an application executable by the at least one hardware processor of the system to perform operations comprising:
  receiving a first activity communication from a device controlled by a first entity, the first activity communication including information about the first entity providing or acquiring the first item, the first activity communication further including a first software identification;
  storing the first activity communication in a first database;
  receiving a second activity communication from the first entity, the second activity communication including additional information about the first entity providing or acquiring the first item, the second activity communication further including a second software identification;
  storing the second activity communication in the first database;
  receiving a request from a device controlled by a second entity, the request including a request to view a common view, in a graphical user interface, for the first item, the request including an identification of the first item;
  in response to the receiving of the request from the second entity, retrieving information from the first activity communication and the second activity communication from the first database using the identification of the first item; and
  causing display in the graphical user interface of the common view including information from both the first activity communication and the second activity communication in a single window.

Example 2

The system of Example 1, wherein the first and second activity communications are Extensible Markup Language (XML) files.

Example 3

The system of Examples 1 or 2, wherein the graphical user interface includes a checkbox allowing a user to turn on and off the ability to cause display in the graphical user interface of the common view including information from both the first activity communication and the second activity communication in a single window.

Example 4

The system of any of Examples 1-3, wherein the second activity communication is an estimate activity communication.

Example 5

The system of any of Examples 1-4, wherein the operations further comprise:
  receiving, via the graphical user interface, a selection of a commit of one of the activity communications;
  accessing the first database to identify the identification associated with the activity communication selected in the commit; and
  sending the commit to Software associated with the identified identification.

Example 6

The system of any of Examples 1-5, wherein the common view includes information from activity communications sent from multiple entities.

Example 7

The system of any of Examples 1-6, wherein the first entity and the second entity are in communication with each other.

Example 8

A computerized method comprising:
  receiving a first activity communication from a device controlled by a first entity, the first activity communication including information about the first entity providing or acquiring the first item, the first activity communication further including a first software identification;
  storing the first activity communication in a first database;
  receiving a second activity communication from the first entity, the second activity communication including additional information about the first entity providing or acquiring the first item, the second activity communication further including a second software identification;
  storing the second activity communication in the first database;
  receiving a request from a device controlled by a second entity, the request including a request to view a common view, in a graphical user interface, for the first item, the request including an identification of the first item;
  in response to the receiving of the request from the second entity, retrieving information from the first activity communication and the second activity communication from the first database using the identification of the first item; and causing display in the graphical user interface of the common view including information from both the first activity communication and the second activity communication in a single window.

Example 9

The method of Example 8, wherein the first and second activity communications are Extensible Markup Language (XML) files.

Example 10

The method of Examples 8 or 9, wherein the graphical user interface includes a checkbox allowing a user to turn on and off the ability to cause display in the graphical user interface of the common view including information from both the first activity communication and the second activity communication in a single window.

Example 11

The method of any of Examples 8-10, wherein the second activity communication is an estimate activity communication.

Example 12

The method of any of Examples 8-11, further comprising:
receiving, via the graphical user interface, a selection of a commit of one of the activity communications;
accessing the first database to identify the identification associated with the activity communication selected in the commit; and
sending the commit to Software associated with the identified identification.

Example 13

The method of any of Examples 8-12, wherein the common view includes information from activity communications sent from multiple entities.

Example 14

The method of any of Examples 8-13, wherein the first entity and the second entity are in communication with each other.

Example 15

A non-transitory machine-readable storage medium comprising instructions, which when implemented by one or more machines, cause the one or more machines to perform operations comprising:
receiving a first activity communication from a device controlled by a first entity, the first activity communication including information about the first entity providing or acquiring the first item, the first activity communication further including a first software identification;
storing the first activity communication in a first database;
receiving a second activity communication from the first entity, the second activity communication including additional information about the first entity providing or acquiring the first item, the second activity communication further including a second software identification;
storing the second activity communication in the first database;
receiving a request from a device controlled by a second entity, the request including a request to view a common view, in a graphical user interface, for the first item, the request including an identification of the first item;
in response to the receiving of the request from the second entity, retrieving information from the first activity communication and the second activity communication from the first database using the identification of the first item; and
causing display in the graphical user interface of the common view including information from both the first activity communication and the second activity communication in a single window.

Example 16

The non-transitory machine-readable storage medium of Example 15, wherein the first and second activity communications are Extensible Markup Language (XML) files.

Example 17

The non-transitory machine-readable storage medium of Examples 15 or 16, wherein the graphical user interface includes a checkbox allowing a user to turn on and off the ability to cause display in the graphical user interface of the common view including information from both the first activity communication and the second activity communication in a single window.

Example 18

The non-transitory machine-readable storage medium of any of Examples 15-17, wherein the second activity communication is an estimate activity communication.

Example 19

The non-transitory machine-readable storage medium of any of Examples 15-18, wherein the operations further comprise:
receiving, via the graphical user interface, a selection of a commit of one of the activity communications,
accessing the first database to identify the identification associated with the activity communication selected in the commit; and
sending the commit to Software associated with the identified identification.

Example 20

The non-transitory machine-readable storage medium of any of Examples 15-19, wherein the common view includes information from activity communications sent from multiple entities.

Figure 8:
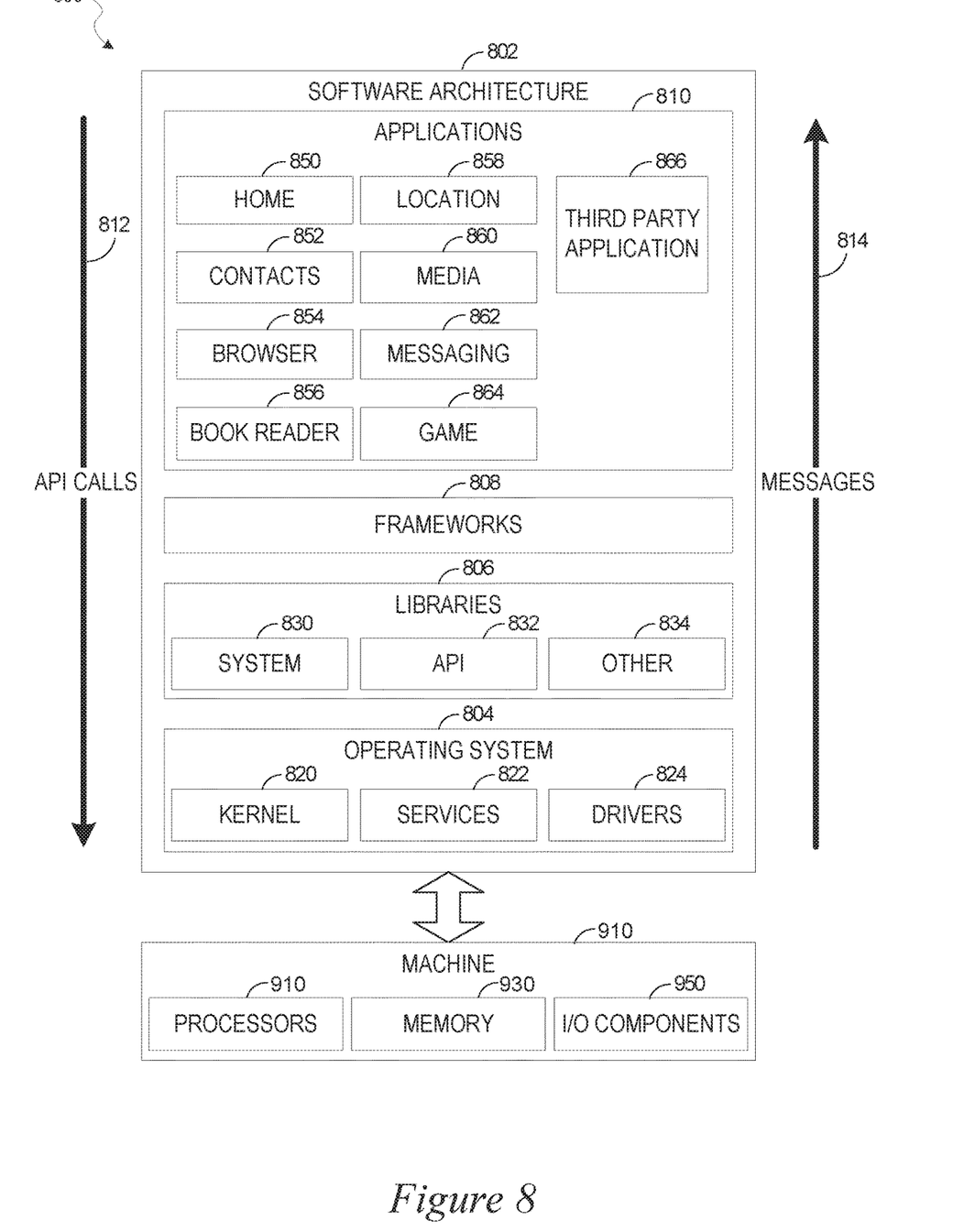
FIG. 8 is a block diagram illustrating an architecture of software, which can be installed on any one or more of the devices described above.

FIG. 8 is a block diagram 800 illustrating an architecture of software 802, which can be installed on any one or more of the devices described above. FIG. 8 is merely a non-limiting example of a software architecture, and it will be appreciated that many other architectures can be implemented to facilitate the functionality described herein. In various embodiments, the software 802 is implemented by hardware such as a machine 900 of FIG. 9 that includes processors 910, memory 930, and input/output (I/O) components 950. In this example architecture, the software 802 can be conceptualized as a stack of layers where each layer may provide a particular functionality. For example, the software 802 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphical user interface (GUI) functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-entity application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-entity application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-entity application 866 can invoke the API calls 812 provided by the operating system 804 to facilitate functionality described herein.

Figure 9:
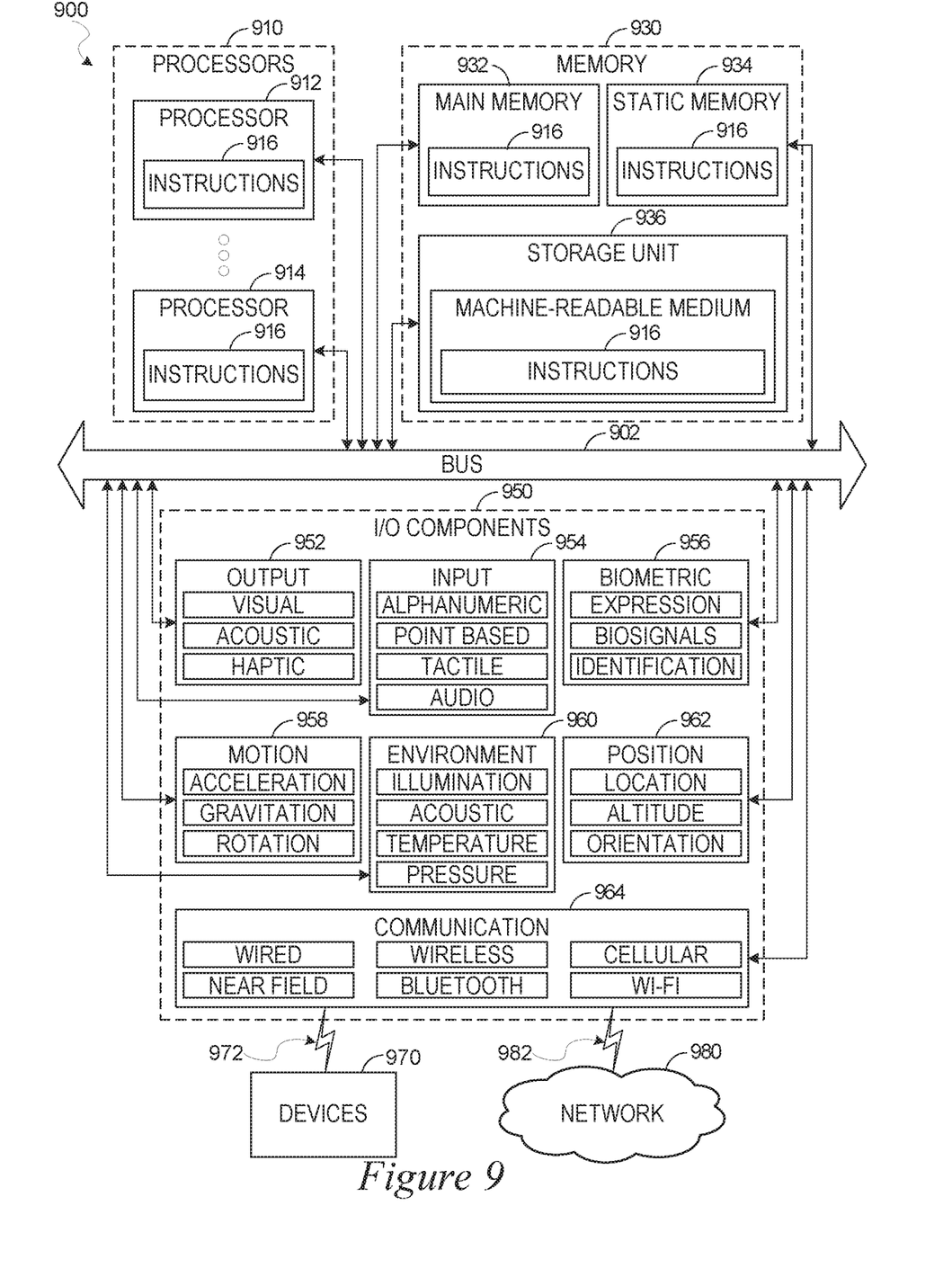
FIG. 9 illustrates a diagrammatic representation of a machine in the form of a computer system within which a set of instructions may be executed for causing the machine to perform any one or more of the methodologies discussed herein, according to an example embodiment.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the method 600 of FIG. 6. Additionally, or alternatively, the instructions 916 may implement FIGS. 1-7, and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions 916 contemporaneously. Although FIG. 9 shows multiple processors 910, the machine 900 may include a single processor 912 with a single core, a single processor 912 with multiple cores (e.g., a multi-core processor 912), multiple processors 912, 914 with a single core, multiple processors 912, 914 with multiple cores, or any combination thereof.

The memory 930 may include a main memory 932, a static memory 934, and a storage unit 936, each accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., coupled via a USB).

Moreover, the communication components 964 may detect identifiers or include components operable to detect identifiers. For example, the communication components 964 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

The various memories (i.e., 930, 932, 934, and/or memory of the processor(s) 910) and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   memory storing an application executable by the at least one hardware processor of the system to perform operations comprising:
   receiving a first activity communication from a device controlled by a first entity; the first activity communication including information about the first entity providing or acquiring the first item, the first activity communication further including a first software identification;
   storing the first activity communication in a first database;
   receiving a second activity communication from the first entity, the second activity, communication including additional information about the first entity providing or acquiring the first item, the second activity communication further including a second software identification;
   storing the second activity communication in the first database;
   receiving a request from a device controlled by a second entity, the request including a request to view a common view, in a graphical user interface, for the first item, the request including an identification of the first item;
   in response to the receiving of the request from the second entity; retrieving information from the first activity communication and the second activity communication from the first database using the identification of the first item; and
   causing display in the graphical user interface of the common view including information from both the first activity communication and the second activity communication in a single window.

2. The system of claim 1, wherein the first and second activity communications are Extensible Markup Language (XML) files.

3. The system of claim 1, wherein the graphical user interface includes a checkbox allowing a user to turn on and off the ability to cause display in the graphical user interface of the common view including information from both the first activity communication and the second activity communication in a single window.

4. The system of claim 1, wherein the second activity communication is an estimate activity communication.

5. The system of claim 1, wherein the operations further comprise:
   receiving, via the graphical user interface, a selection of a commit of one of the activity communications;
   accessing the first database to identify the identification associated with the activity communication selected in the commit; and
   sending the commit to software associated with the identified identification.

6. The system of claim 1, wherein the common view includes information from activity communications sent from multiple entities.

7. The system of claim 1, wherein the first entity and the second entity are in communication with each other.

8. A computerized method comprising:
   receiving a first activity communication from a device controlled by a first entity, the first activity communication including information about the first entity providing or acquiring the first item, the first activity communication further including a first software identification;
   storing the first activity communication in a first database;
   receiving a second activity communication from the first entity, the second activity communication including additional information about the first entity providing or acquiring the first item, the second activity communication further including a second software identification;
   storing the second activity communication in the first database;
   receiving a request from a device controlled by a second entity, the request including a request to view a common view, in a graphical user interface, for the first item, the request including an identification of the first item;
   in response to the receiving of the request from the second entity, retrieving information from the first activity communication and the second activity communication from the first database using the identification of the first item; and
   causing display in the graphical user interface of the common view including information from both the first activity communication and the second activity communication in a single window.

9. The method of claim 8, wherein the first and second activity communications are Extensible Markup Language (XML) files.

10. The method of claim 8, wherein the graphical user interface includes a checkbox allowing a user to turn on and off the ability to cause display in the graphical user interface of the common view including information from both the first activity communication and the second activity communication in a single window.

11. The method of claim 8, wherein the second activity communication is an estimate activity communication.

12. The method of claim 8, further comprising:
   receiving, via the graphical user interface, a selection of a commit of one of the activity communications;
   accessing the first database to identify the identification associated with the activity communication selected in the commit; and
   sending the commit to Software associated with the identified identification.

13. The method of claim 8, wherein the common view includes information from activity communications sent from multiple entities.

14. The method of claim 8, wherein the first entity and the second entity are in communication with each other.

15. A non-transitory machine-readable storage medium comprising instructions, which when implemented by one or more machines; cause the one or more machines to perform operations comprising:
   receiving a first activity communication from a device controlled by a first entity, the first activity communication including information about the first entity providing or acquiring the first item, the first activity communication further including a first software identification;
   storing the first activity communication in a first database;
   receiving a second activity communication from the first entity, the second activity communication including additional information about the first entity providing or acquiring the first item, the second activity communication further including a second software identification;
   storing the second activity communication in the first database;
   receiving a request from a device controlled by a second entity, the request including a request to view a common view, in a graphical user interface, for the first item, the request including an identification of the first item;
   in response to the receiving of the request from the second entity, retrieving information from the first activity communication and the second activity communication from the first database using the identification of the first item; and
   causing display in the graphical user interface of the common view including information from both the first activity communication and the second activity communication in a single window.

16. The non-transitory machine-readable storage medium of claim 15, wherein the first and second activity communications are Extensible Markup Language (XML) files.

17. The non-transitory machine-readable storage medium of claim 15, wherein the graphical user interface includes a checkbox allowing a user to turn on and off the ability to cause display in the graphical user interface of the common view including information from both the first activity communication and the second activity communication in a single window.

18. The non-transitory machine-readable storage medium of claim 15, wherein the second activity communication is an estimate activity communication.

19. The non-transitory machine-readable storage medium of claim 15, wherein the operations further comprise:
   receiving, via the graphical user interface, a selection of a commit of one of the activity communications;
   accessing the first database to identify the identification associated with the activity communication selected in the commit; and
   sending the commit to Software associated with the identified identification.

20. The non-transitory machine-readable storage medium of claim 15, wherein the common view includes information from activity communications sent from multiple entities.

* * * * *